United States Patent
Grzechnik et al.

(10) Patent No.: US 8,929,658 B2
(45) Date of Patent: Jan. 6, 2015

(54) PROVIDING MAGNETIC DEVIATION TO MOBILE DEVICES

(75) Inventors: Slawomir K. Grzechnik, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 12/971,309

(22) Filed: Dec. 17, 2010

(65) Prior Publication Data

US 2012/0155382 A1    Jun. 21, 2012

(51) Int. Cl.
- G06K 9/00    (2006.01)
- G06F 19/00   (2011.01)
- G01C 17/38   (2006.01)

(52) U.S. Cl.
CPC ................................ G01C 17/38 (2013.01)
USPC ..................................... 382/181; 702/92

(58) Field of Classification Search
None
See application file for complete search history.

(56) References Cited

U.S. PATENT DOCUMENTS

| | | |
|---|---|---|
| 3,859,731 A | 1/1975 | Endo |
| 6,363,250 B1 | 3/2002 | Lindell |
| 6,408,251 B1 | 6/2002 | Azuma |
| 7,440,610 B1 | 10/2008 | Wirtz et al. |
| 7,630,737 B2 | 12/2009 | Pande et al. |
| 8,494,553 B2 | 7/2013 | Grzechnik |
| 8,565,528 B2 | 10/2013 | Grzechnik et al. |
| 2005/0246099 A1 | 11/2005 | Jendbro et al. |
| 2008/0201096 A1* | 8/2008 | Wright et al. ................. 702/92 |
| 2009/0080697 A1 | 3/2009 | Kishikawa et al. |
| 2009/0265633 A1* | 10/2009 | Lim et al. ..................... 715/733 |
| 2011/0153250 A1* | 6/2011 | Bailey .............................. 702/94 |
| 2012/0155770 A1 | 6/2012 | Grzechnik et al. |
| 2012/0178469 A1 | 7/2012 | Grzechnik |
| 2013/0310071 A1 | 11/2013 | Grzechnik |

FOREIGN PATENT DOCUMENTS

| | | |
|---|---|---|
| EP | 0427431 A2 | 5/1991 |
| JP | 2002333325 A | 11/2002 |
| JP | 2005106532 A | 4/2005 |
| JP | 2010033447 A | 2/2010 |
| KR | 20100060472 A | 6/2010 |
| TW | 200942850 A | 10/2009 |
| TW | 201005563 A | 2/2010 |
| TW | 201011433 A | 3/2010 |
| TW | 201040648 A | 11/2010 |
| WO | 9305474 A1 | 3/1993 |
| WO | WO03093762 A1 | 11/2003 |
| WO | 2009098154 A1 | 8/2009 |

OTHER PUBLICATIONS

U.S.G.S. Website [online]. United States Geological Society, Aug. 12, 2009 [retrieved Jan. 14, 2014]. Retrieved from the Internet: < URL: http://web.archive.org/web /20090812232645 /http://geomag.usgs.gov/models/>, pp. 1-4.*

(Continued)

*Primary Examiner* — Bhavesh Mehta
*Assistant Examiner* — David F Dunphy
(74) *Attorney, Agent, or Firm* — Jennifer M. Pascua (57) ABSTRACT

A method of providing magnetic deviation corresponding to positions in a wireless communication system includes receiving a request wirelessly for a magnetic deviation corresponding to a position of an access terminal, the request including the position of the access terminal; retrieving the magnetic deviation corresponding to the position of the access terminal from a repository; and transmitting wirelessly the magnetic deviation corresponding to the position of the access terminal to the access terminal.

18 Claims, 8 Drawing Sheets

(56) References Cited

OTHER PUBLICATIONS

Interpex Website [online]. Interplex, Nov. 5, 2008 [retrieved Jan. 15, 2014 ]. Retrieved from the Internet: < URL: http://web.archive.org/web /20081105093757/http://www.interpex.com/geomagix/magfield.htm >, p. 1.*

"Operations" [online]. United States Geological Survey (U.S.G.S.), 2008 [retrieved May 12, 2014]. Retrieved from the Internet: < URL: http://web.archive.org/web/20080916010152/http://geomag.usgs.gov/operations.php>, pp. 1-2.*

Hoff B. et al., "Autocalibration of an electronic compass in an outdoor augmented reality system", In Proc. ISAR 2000, pp. 159-164, 2000.

International Search Report and Written Opinion—PCT/US2011/029006—ISA/EPO—Dec. 9, 2011

Kiyohide Satoh et al.,"A Hybrid Registration Method for Outdoor Augmented Reality," isar, pp. 67, IEEE and ACM International Symposium on Augmented Reality (ISAR'01), 2001.

Liebe C C et al: "Algorithms onboard the Oersted microsatellite stellar compass", Proceedings of the SPIE—The International Society for Optical Engineering, vol. 2810, 1996, pp. 239-251, XP002654563, SPIE-Int. Soc. Opt. Eng. USA ISSN: 0277-78.

"Magnetic Declination", ODOT Surveyors Conference, Feb. 2004, pp. 1-4, XP002654564, Retrieved from the Internet: URL:www.Oregon.gov/ODOT/HWY/GEOMETRONICS/docs/TheCompass.pdf"ga=t [retrieved on Oct. 20, 2011] p. 1, paragraph 1-8.

Schall G et al., "Global pose estimation using multi-sensor fusion for outdoor augmented reality", In Proc. ISMAR 2009, pp. 153-162, Orlando, Florida, USA, 2009.

Deutscher Hochseesportverband., "Hansa" e.V.: "Seemannschaft Handbuch fuer den Yachtsport passage", 2003, Delius Klasing Verlag, Bielefeld, 26th edition, pp. 502-503, XP007920486, ISBN: 3-7688-0523-9.

Vooren R., "Leidraad Voor Kajuitjachtzeilers Passage", 2001, Het Goede Boek, Huizen,3rd edition, pp. 198-199, XP007920485.

* cited by examiner

PROVIDING MAGNETIC DEVIATION TO MOBILE DEVICES

CROSS REFERENCES TO RELATED APPLICATIONS

The present application is related to U.S. patent application Ser. No. 12/971,257, filed on Dec. 17, 2010, and entitled "Magnetic Deviation Determination Using Mobile Devices," the entirety of which is herein incorporated by reference for all purposes.

BACKGROUND

Wireless communication systems are widely deployed to provide various communication services and location services to mobile users. Users in the system rely on position determination functionality to provide location services including navigation, location-based services, and point-of-interest applications.

A number of techniques exist to determine position of an access terminal in a wireless communication system, including Global Positioning System (GPS) techniques, Assisted GPS (A-GPS), and cell-based positioning methods such as Cell of Origin (COO), Time of Arrival (TOA), and Angle of Arrival (AOA). These techniques have varying degrees of precision, which may not provide the accuracy needed by many of today's location-based services. For example, GPS positioning can be especially inaccurate in urban environments, where tall, densely packed buildings can restrict views of satellites and the reflective surfaces of buildings can cause multipath effects.

With advances in sensor technology, electronic magnetometers are becoming standard equipment in access terminals, performing the function of classic magnetic compasses in navigation. If magnetic devices are used to determine direction or position, it is important to apply two corrections to the magnetic readings to express measured angles with respect to True geographical North. The two corrections are magnetic declination and magnetic deviation. It is well known that the Earth's magnetic field is not aligned with True North, and this misalignment depends on the location. The difference between True North and Magnetic North is called magnetic declination or variation. Very accurate models of the Earth's magnetic field can be used to provide the sign and value of magnetic declination. Additionally, the change in magnetic declination with time is well known for every place. Thus, magnetic readings can be corrected for magnetic declination, for example, by accessing publicly available magnetic declination data.

Magnetic deviation, the second correction, is a local disturbance of the Earth's magnetic field caused by metal objects added to the environment by human activity. Most civil engineering objects and modern buildings contain large amounts of steel in their structures. Each piece of the structure is magnetized and changes the direction of the Earth's local magnetic field. For a given location, the difference between Magnetic North and North shown by a magnetic device is called magnetic deviation.

Magnetic deviation in modern urban environments can reach very high values and can change rapidly from place to place, for example, over the distance of meters. Modeling magnetic deviation would require knowing and taking into account magnetic contributions of all pieces of hard and soft steel within a radius of up to about 50 meters, making it a very difficult if not impossible task. Yet not knowing and correcting for magnetic deviation can render magnetic device readings practically useless for navigation and guiding purposes in some environments.

SUMMARY

An example of a method of providing magnetic deviation corresponding to positions in a wireless communication system according to the disclosure includes receiving a request wirelessly for a magnetic deviation corresponding to a position of an access terminal, the request including the position of the access terminal; retrieving the magnetic deviation corresponding to the position of the access terminal from a repository; and transmitting wirelessly the magnetic deviation corresponding to the position of the access terminal to the access terminal.

Embodiments of such a method may include one or more of the following features. The method further includes transmitting wirelessly the magnetic deviation corresponding to the position of the access terminal to other access terminals with approximately the same position. Retrieving the magnetic deviation includes: determining that a magnetic deviation corresponding to the position of the access terminal is not available in the repository; and calculating the magnetic deviation corresponding to the position of the access terminal by retrieving from the repository magnetic deviations corresponding to positions near the position of the access terminal and interpolating these magnetic deviations.

An example of an access terminal of a wireless communication system includes: a magnetometer configured to make a magnetic measurement; a transceiver communicatively coupled to the magnetometer and configured to transmit and receive information wirelessly; and a processor communicatively coupled to the transceiver and the magnetometer and configured to: transmit, wirelessly via the transceiver, a request for a correction term for the magnetic measurement, the request including a position of the access terminal; receive, wirelessly via the transceiver, the correction term in response to the request, the correction term including a magnetic deviation corresponding to the position of the access terminal; and correct the magnetic measurement using the correction term.

Embodiments of such an access terminal may include the following feature. The correction term includes a magnetic declination corresponding to the position of the access terminal.

An example of a computer program product includes a processor-readable medium storing processor-readable instructions configured to cause a processor to: retrieve from a repository a magnetic deviation corresponding to a position of an access terminal of a wireless communication system, the retrieval in response to a request wirelessly received for the magnetic deviation, the request including the position of the access terminal; and provide the magnetic deviation corresponding to the position of the access terminal for transmitting wirelessly to the access terminal.

Embodiments of such a computer program product may include one or more of the following features. The computer program product further includes instructions configured to cause the processor to provide the magnetic deviation corresponding to the position of the access terminal for transmitting wirelessly to other access terminals with approximately the same position. The instructions configured to cause the processor to retrieve the magnetic deviation comprise instructions configured to cause the processor to: determine that a magnetic deviation corresponding to the position of the access terminal is not available in the repository; and calculate the magnetic deviation corresponding to the position of the access terminal by retrieving from the repository magnetic deviations corresponding to positions near the position of the access terminal and interpolating these magnetic deviations.

An example of a computer program product includes a processor-readable medium storing processor-readable instructions configured to cause a processor to: request a correction term for a magnetic measurement of an access terminal of a wireless communication system, the request including a position of the access terminal; access the correction term which is wirelessly received in response to the request, the correction term including a magnetic deviation corresponding to the position of the access terminal; and correct the magnetic measurement using the correction term.

Embodiments of such a computer program product may include the following feature. The correction term includes a magnetic declination corresponding to the position of the access terminal.

An example of an apparatus configured to provide magnetic deviation corresponding to positions in a wireless communication system includes: means for receiving a request wirelessly for a magnetic deviation corresponding to a position of an access terminal, the request including the position of the access terminal; means for retrieving the magnetic deviation corresponding to the position of the access terminal from a repository; and means for transmitting wirelessly the magnetic deviation corresponding to the position of the access terminal to the access terminal.

Embodiments of such an apparatus may include one or more of the following features. The apparatus further includes means for transmitting wirelessly the magnetic deviation corresponding to the position of the access terminal to other access terminals with approximately the same position. The means for retrieving the magnetic deviation include: means for determining that a magnetic deviation corresponding to the position of the access terminal is not available in the repository; and means for calculating the magnetic deviation corresponding to the position of the access terminal by retrieving from the repository magnetic deviations corresponding to positions near the position of the access terminal and interpolating these magnetic deviations.

An example of an apparatus includes: means for requesting a correction term for a magnetic measurement of an access terminal of a wireless communication system, the request including a position of the access terminal; means for wirelessly receiving the correction term in response to the request, the correction term including a magnetic deviation corresponding to the position of the access terminal; and means for correcting the magnetic measurement using the correction term.

Embodiments of such an apparatus may include the following feature. The correction term includes a magnetic declination corresponding to the position of the access terminal.

Items and/or techniques described herein may provide one or more of the following capabilities. Knowing magnetic deviation of a location can enhance performance of compass applications used for direction finding. Navigation using compass bearings when magnetic deviation correction is known may provide better accuracy than GPS, especially in urban environments. Determining magnetic deviation enables mobile access terminals to navigate in urban environments using navigation techniques based on magnetic bearings to objects. Access terminals enabled with computer vision techniques can determine magnetic deviation corresponding to their positions. Once position and magnetic deviation pairs from these access terminals are stored in a repository, less-advanced access terminals that are not enabled with computer vision techniques can correct their magnetic readings by querying the repository for the magnetic deviation corresponding to their positions. Over time, collecting position and magnetic deviation pairs would enable creating detailed maps of magnetic disturbances. These maps could be utilized by Geological Survey, city services, and others. While item/technique-effect pairs have been described, it may be possible for a noted effect to be achieved by means other than those noted, and a noted item/technique may not necessarily yield the noted effect.

BRIEF DESCRIPTION OF THE DRAWINGS

In the figures, components with similar relevant characteristics and/or features may have the same reference label.

DETAILED DESCRIPTION

Techniques described herein provide mechanisms for determining magnetic deviation corresponding to a position of an access terminal of a wireless communication system. For example, an access terminal can provide an image captured by the access terminal and a position of the access terminal, while another component of the wireless communication system can provide multiple keypoints and their geographical locations. The magnetic deviation corresponding to the position of the access terminal is determined by calculating a compass bearing and a true bearing to a feature within the image using the position of the access terminal and the geographical location of a keypoint determined as corresponding to the feature. Pairs of positions and magnetic deviations received from the access terminal and other access terminals are stored in a repository. An access terminal can correct its magnetic measurement by wirelessly transmitting a request for a correction term and wirelessly receiving the location-dependent correction term, including a magnetic deviation, from the repository. Other embodiments are within the scope of the disclosure and claims.

Techniques described herein may be used for various wireless communication systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Figure 1:
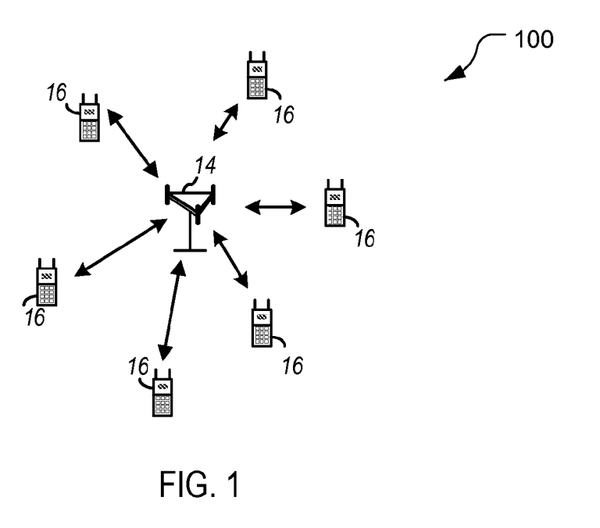
FIG. 1 is a simplified diagram of a wireless communication system, including a base station and access terminals.

Referring to FIG. 1, a wireless communication system 100 includes a base transceiver station (BTS) 14 and mobile access terminals 16 (ATs). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier.

The BTS 14 can wirelessly communicate with the ATs 16. The BTS 14 may also be referred to as an access point, an access node (AN), a Node B, an evolved Node B (eNB), etc. The BTS 14 can be configured to communicate with the ATs 16 via multiple carriers. The BTS 14 can provide communication coverage for a respective geographic area, for example, a cell (not shown).

The ATs 16 may be referred to as mobile stations, mobile devices, user equipment (UE), or subscriber units. The ATs 16 here include cellular phones and a wireless communication device, but can also include personal digital assistants (PDAs), other handheld devices, netbooks, notebook computers, etc.

Figure 2:
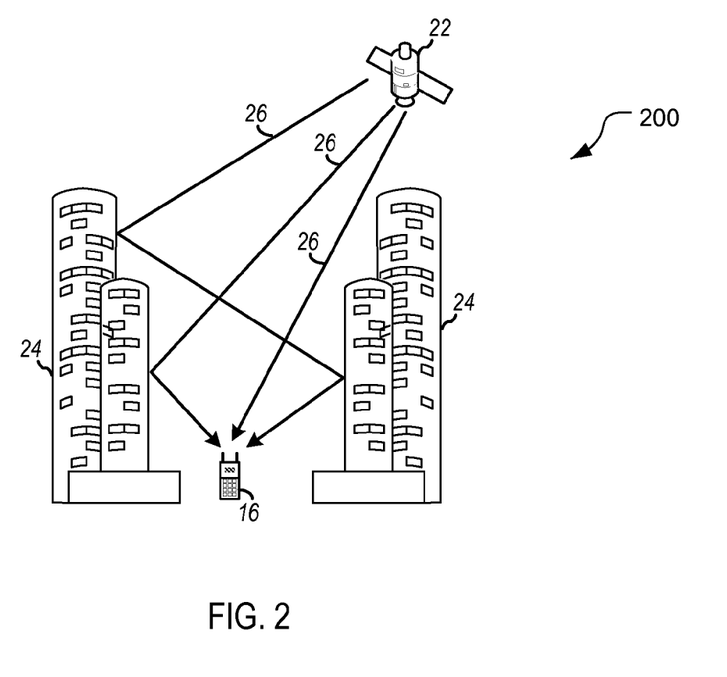
FIG. 2 is a simplified diagram of an access terminal shown in FIG. 1 receiving positioning information from a satellite in an urban environment.

Referring to FIG. 2, a satellite 22 can wirelessly communicate with an AT 16 in an urban environment 200. The satellite 22 can be part of a global navigation satellite system, e.g., the Global Positioning System (GPS), the GLObal NAvigation Satellite System (GLONASS), or the Galileo system. Here, the satellite 22 is a GPS satellite with a transmitter capable of transmitting information about the position of the AT 16. The AT 16 includes a GPS receiver capable of wirelessly receiving position information from the satellite 22. The position information transmitted can include an estimated position of the AT 16 defined under a geographic coordinate system. For example, the position of the AT 16 can be specified by geographical latitude and longitude and, optionally, a geodesic height.

The AT 16 of FIG. 2 is located in an urban environment 200. GPS positioning can be especially unreliable in the canyon-like landscape of modern streets in urban environments. For example, tall, densely packed buildings 24 can restrict views of the satellite 22 and large reflective surfaces of modern buildings 24 can cause multiple transmission paths 26 to interfere destructively. The highly disturbed GPS position information can limit the usability of location services (e.g., navigation, location-based services, and point-of-interest applications) available to the AT 16 in the urban environment 200.

Magnetic Declination and Magnetic Deviation of a Location

Figure 3:
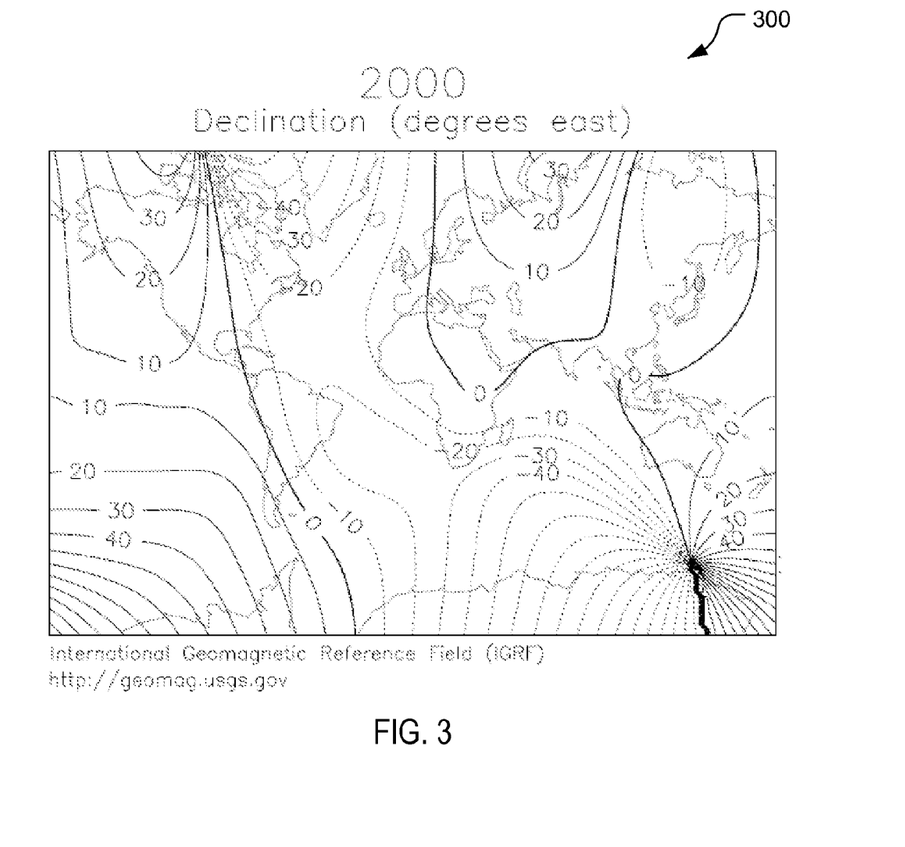
FIG. 3 is a chart of magnetic declination around the world for the year 2000.

It is well known that the Earth's magnetic field is not aligned with True North, and this misalignment depends on the location. The difference between True North and Magnetic North is called magnetic declination or variation. Referring to FIG. 3, a chart 300 illustrates magnetic declination around the world for the year 2000. The chart 300, produced by the U.S. Geological Survey, provides the sign and value of magnetic declination, in increments of ten degrees. The magnetic declination and its change with time can be accurately modeled. Thus, magnetic readings can be corrected for magnetic declination if position is known and the magnetic declination for the position is accessible.

Figure 4:
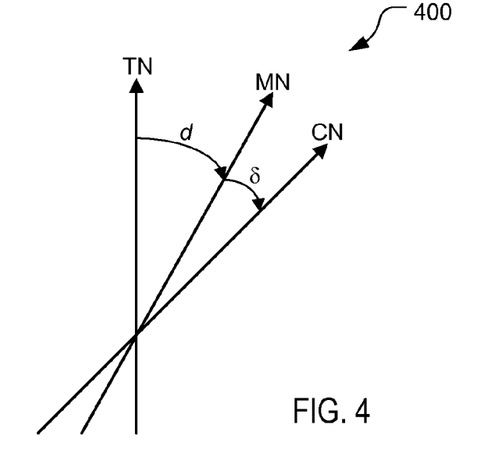
FIG. 4 is a simplified diagram of the relationships between True North, Magnetic North, and Compass North.

Referring to FIG. 4, a simplified diagram 400 illustrates the relationships between True North, Magnetic North, and Compass North. True North (i.e., geographical North) is the direction pointing to the North Pole. True North is also the direction of the local meridian. Magnetic North is the direction of the Earth's magnetic field at a given location. Magnetic meridians are complex curves on the surface of the Earth, as illustrated by chart 300 of FIG. 3. Magnetic meridians converge in magnetic poles, which are a few hundred miles away from the geographical poles. Compass North is the direction shown by a magnetic device (e.g., the direction shown by a magnetic compass needle) at a given location. For example, the compass needle is aligned by the magnetic force that is the vector sum of the Earth's magnetic force of the location and the magnetic force of ferrous objects in the vicinity.

The diagram 400 also illustrates magnetic declination, d, and magnetic deviation, δ. Magnetic declination d is the angle between True North and Magnetic North of the location. Magnetic declination d is positive or East if Magnetic North is to the right of True North and negative or West if Magnetic North is to the left of True North. Magnetic deviation δ is the angle between Magnetic North and Compass North of the location. Magnetic deviation δ is positive or East if Compass North is to the right of Magnetic North and negative or West if Compass North is to the left of Magnetic North.

Equations (1) and (2) illustrate the relationships between True North, Magnetic North, Compass North, magnetic declination, and magnetic deviation.

$$MB=CB+\delta. \tag{1}$$

$$TB=MB+d=CB+\delta+d. \tag{2}$$

In equations (1) and (2), MB is the magnetic bearing with respect to Magnetic North, TB is the true bearing with respect to True North, CB is the compass bearing with respect to Compass North, δ is the magnetic deviation, and d is the magnetic declination.

Components of an Access Terminal

Figure 5:
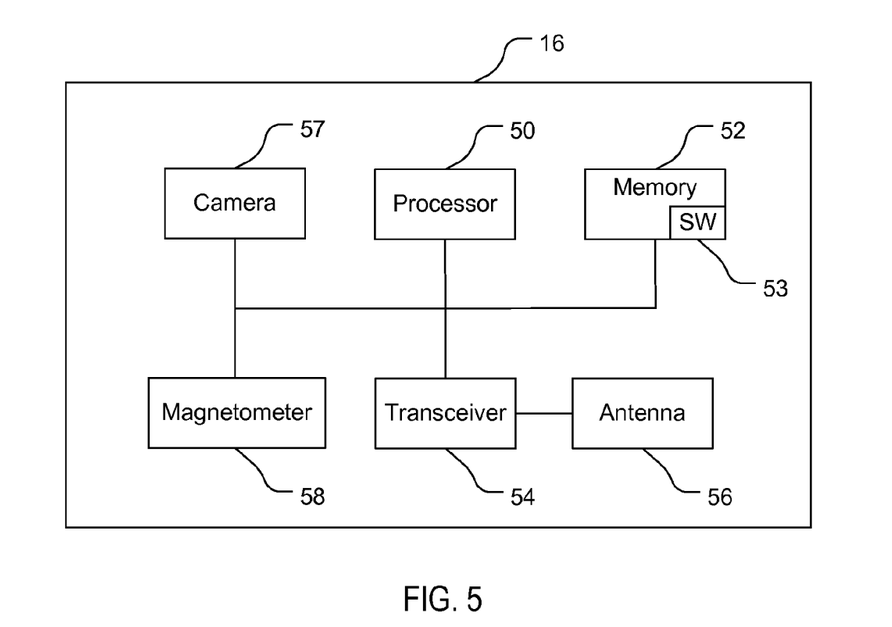
FIG. 5 is a block diagram of components of an access terminal shown in FIG. 1.

Referring to FIG. 5, an exemplary one of the ATs 16 comprises a computer system including a processor 50, memory 52, a transceiver 54, an antenna 56, a camera 57, and a magnetometer 58. The transceiver 54 is configured to communicate bi-directionally with the BTS 14 via the antenna 56. The transceiver 54, processor 50, memory 52, and software 53 are configured, for example, to transmit a request to the BTS 14 for keypoints and their geographical locations near a position of the AT 16 and to receive multiple keypoints and geographical locations in response to the request. In some implementations, the transceiver 54, processor 50, memory 52, and software 53 are further configured to receive wirelessly information (e.g., a position of the AT 16) from the satellite 22 of FIG. 2. Alternatively, the computer system can further include another receiver (not shown) configured to wirelessly receive information from the satellite 22 via another antenna (not shown). The processor 50 is preferably an intelligent hardware device, e.g., a central processing unit (CPU) such as those made by Intel® Corporation or AMD®, a microcontroller, an application specific integrated circuit (ASIC), etc. The memory 52 includes random access memory (RAM) and read-only memory (ROM). The memory 52 stores computer-readable, computer-executable software code 53 containing instructions that are configured to, when executed, cause the processor 50 to perform various functions described herein. Alternatively, the software 53 may not be directly executable by the processor 50 but configured to cause the computer, e.g., when compiled and executed, to perform the functions described. The camera 57 is configured to capture images. The magnetometer 58 is configured to make magnetic measurements. In some implementations, the magnetometer 58 is also configured to determine heading of the AT 16.

Process of Magnetic Deviation Determination

Figure 7:
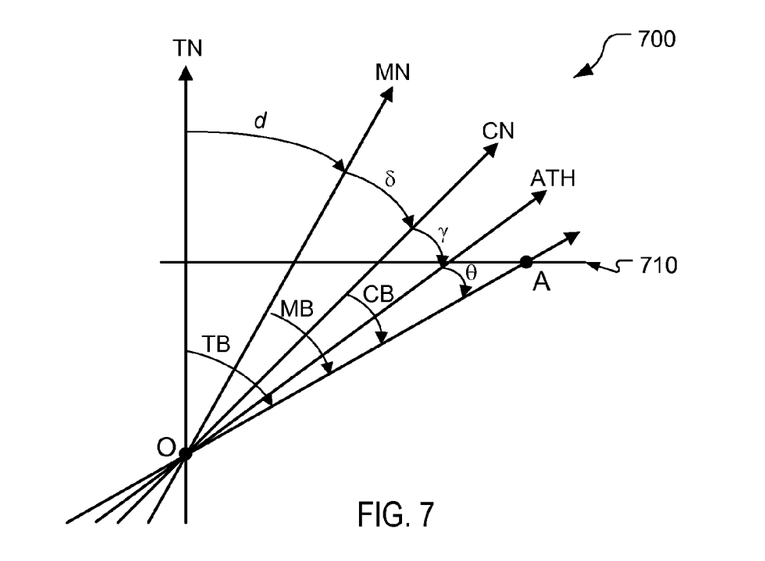
FIG. 7 is a simplified diagram of the relationships between True North, Magnetic North, Compass North, heading of an access terminal shown in FIG. 1, and bearing to a feature.
Figure 8:
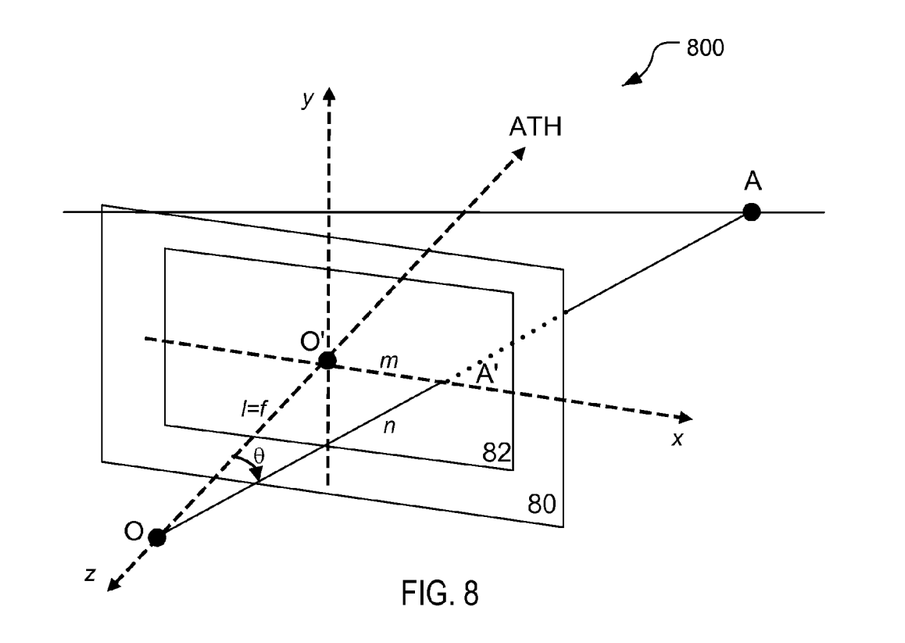
FIG. 8 is a perspective view of an image point of a feature within an image captured by a camera of an access terminal shown in FIG. 1.
Figure 9:
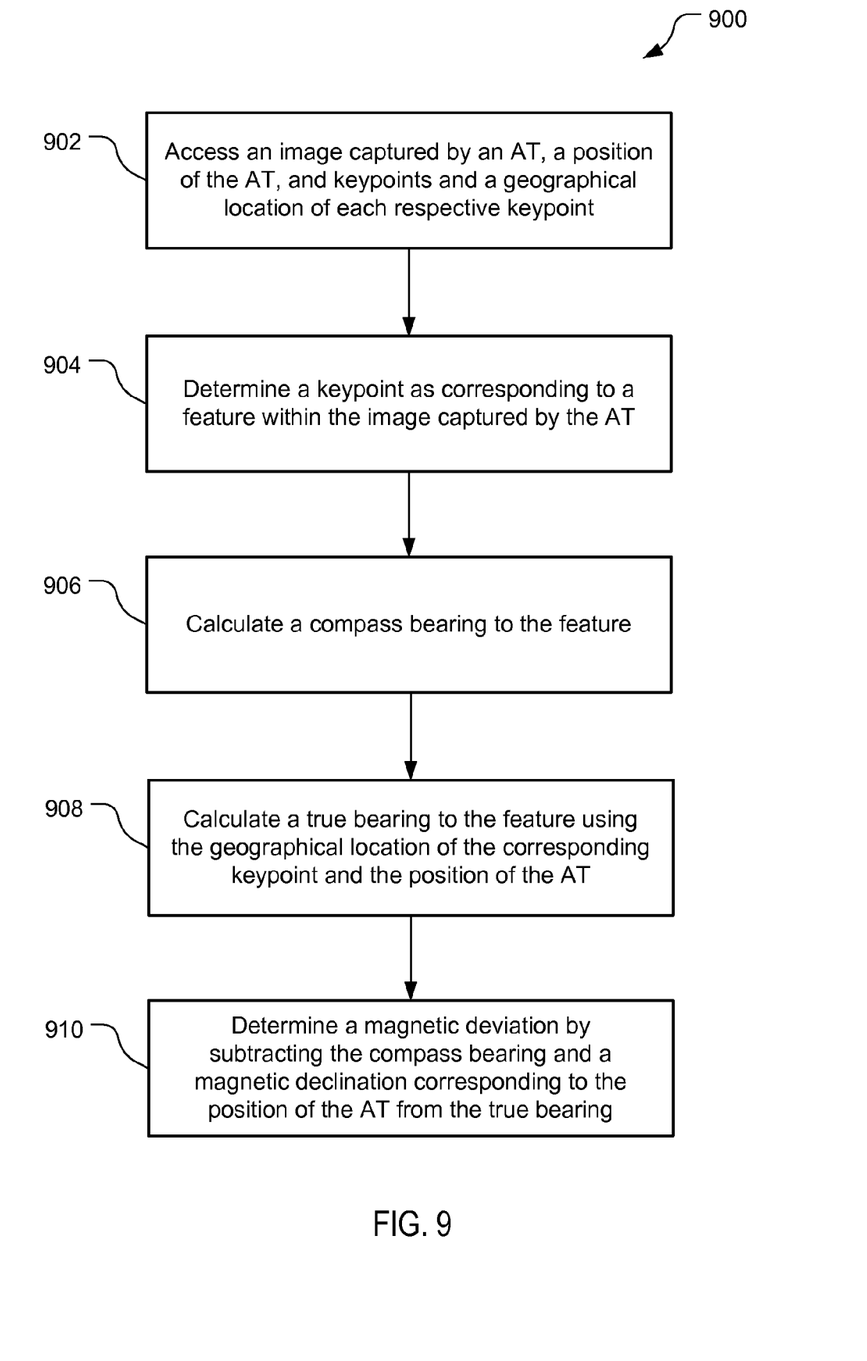
FIG. 9 is a block flow diagram of a process of determining magnetic deviation corresponding to a position of an access terminal of the wireless communication system shown in FIG. 1.

Referring to FIG. 9, with further reference to FIGS. 5-8 and 10, a process 900 of determining magnetic deviation corresponding to a position of an AT 16 of a wireless communication system 100 includes the stages shown. The process 900 is, however, exemplary only and not limiting. The process 900 can be altered, e.g., by having stages added, removed, or rearranged.

At stage 902, a processor accesses an image captured by an AT 16, a position of the AT 16, and multiple keypoints and a geographical location of each respective keypoint. Each geographical location is a location near the position of the AT 16. In some implementations, the processor 50 is part of the AT 16. In these implementations, the AT 16 can determine the position of the AT 16. Alternatively, the position of the AT 16 is determined by another entity of the wireless communication system 100, such as a position determining entity (PDE). The position of the AT 16 is then transmitted to the transceiver 54 of the AT 16. In other implementations, the processor is part of some other entity of the wireless communication system 100, for example, the BTS 14. The entity can either determine the position of the AT 16 or wirelessly receive the position of the AT 16 from another entity of the wireless communication system 100, for example, the AT 16.

Figure 6:
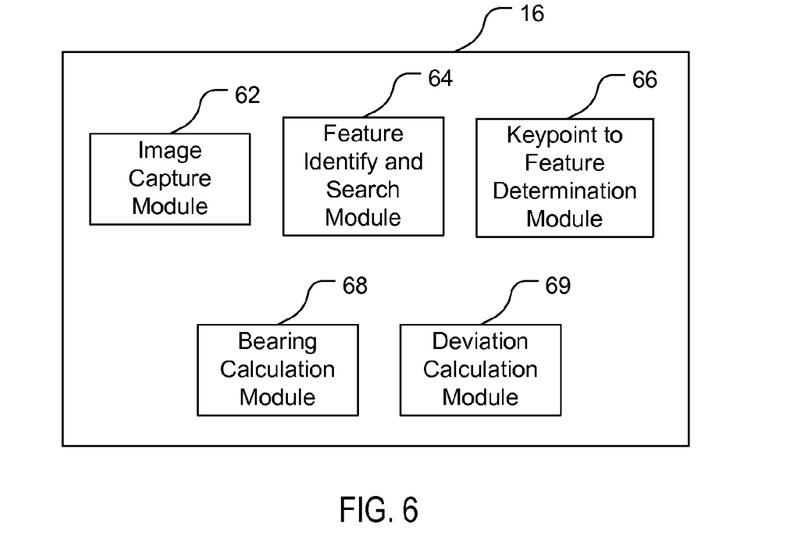
FIG. 6 is a block diagram of functional components of an access terminal shown in FIG. 1.

Referring to FIG. 6, the AT 16 includes an image capture module 62, a feature identify and search module 64, a keypoint to feature determination module 66, a bearing calculation module 68, and a deviation calculation module 69. The image capture module 62 is configured to capture images, e.g., using the camera 57 of FIG. 5. A camera of the AT 16 can capture one or more images. If the processor performing the process 900 is part of some other entity of the wireless communication system 100, the captured image can be wirelessly transmitted from the AT 16 to the respective entity.

If the processor performing the process 900 is part of the AT 16, the transceiver 54 of the AT 16 can wirelessly receive multiple keypoints and a geographical location of each respective keypoint. The transceiver of the AT 16 can wirelessly transmit a request for the multiple keypoints and geographical locations. The request can include the position of the AT 16. If the processor performing the process 900 is part of some other entity of the wireless communication system 100, the entity can either retrieve the multiple keypoints and geographical locations from a repository accessible by the entity or wirelessly receive the multiple keypoints and geographical locations from another entity of the wireless communication system 100.

At stage 904, the processor 50 determines a keypoint from the multiple keypoints as corresponding to a feature within the image captured by the AT 16. The processor 50 identifies the feature (e.g., by determining its characteristics) within the image and searches the multiple keypoints for the identified feature.

Here, the identify, search, and determine functions are performed by the processor 50 of the AT 16. The feature identify and search module 64 of FIG. 6 is configured to identify one or more features within a captured image and to search for these identified features from multiple keypoints, e.g., from a list of multiple keypoints. The features can be identified as natural geographic features (e.g., mountains, lakes, rivers, ravines) and man-made features (e.g., buildings, bridges, communication towers, roads). The keypoints are accessed, along with their known geographical locations (e.g., as latitudinal and longitudinal coordinates), at the AT 16. The features are physical descriptions of keypoints. A keypoint or feature is specified or defined by a digital representation (e.g., a pattern, a profile, or a signature) of the physical appearance of the keypoint or feature from one or more perspectives (e.g., a perspective of the camera 57 of the AT 16). The feature identify and search module 64 can perform the feature identification or recognition function using techniques known in the art.

The search function of the feature identify and search module 64 can include comparing the digital representation of an identified feature in a captured image with the digital representations of the keypoints to find one or more possible match candidates. In some implementations, the feature identify and search module 64 is, alternatively or additionally, configured to search the identified features for the keypoints. Alternatively still, the BTS 14 or some other entity of the wireless communication system 100 determines the correspondence between keypoints and features, and information about the correspondence is transmitted to the transceiver of the AT 16.

The keypoint to feature determination module 66 of FIG. 4 is configured to determine a keypoint as corresponding to a feature within an image captured by the AT 16. The correspondence of a keypoint to an identified feature can be determined, for example, by selecting the best match of the possible match candidates found from the search function of the feature identify and search module 64. A keypoint is determined as corresponding to an identified feature if the digital representation of the identified feature and the digital representation of the determined keypoint differ by less than a threshold amount and by the smallest amount compared to the differences of the digital representation of the identified feature and the digital representations of all the other keypoints. A keypoint is determined as not corresponding to any of the identified features if the digital representation of the keypoint differs from each of the digital representations of the identified features by the threshold amount or more. Preferably, the determination function of the keypoint to feature determination module 66 is integrated with the search function of the feature identify and search module 64.

In other implementations, the processor performing the process 900 is part of some other entity of the wireless communication system 100, for example, the BTS 14. This entity can either determine a keypoint as corresponding to a feature within the image.

Returning to FIG. 9, at stage 906, the processor calculates a compass bearing to the feature within the image. Calculating the compass bearing includes calculating a bearing to the feature with respect to a heading of the AT 16. An example process 1000 of FIG. 10, described below, is provided for calculating a bearing to the feature with respect to the heading of the AT 16. The heading of the AT 16 is determined by the AT 16, for example, by the processor 50 and/or the magnetometer 58 of the AT 16.

FIG. 7 is an extension of FIG. 4, where the diagram 700 further illustrates the heading of the AT 16 (i.e., ATH), a feature A within the captured image, the true bearing (i.e., TB), the magnetic bearing (i.e., MB), and a compass bearing (i.e., CB) to the feature A. As illustrated, the compass bearing is the sum of the AT 16 heading (i.e., γ), with respect to Compass North, and the bearing to the feature A (i.e., θ), with respect to the AT 16 heading. This relationship is given by:

$$CB = \gamma + \theta. \quad (3)$$

Thus, true bearing (i.e., TB) can be expressed as follows:

$$TB = d + \delta + \gamma + \theta. \quad (4)$$

Figure 10:
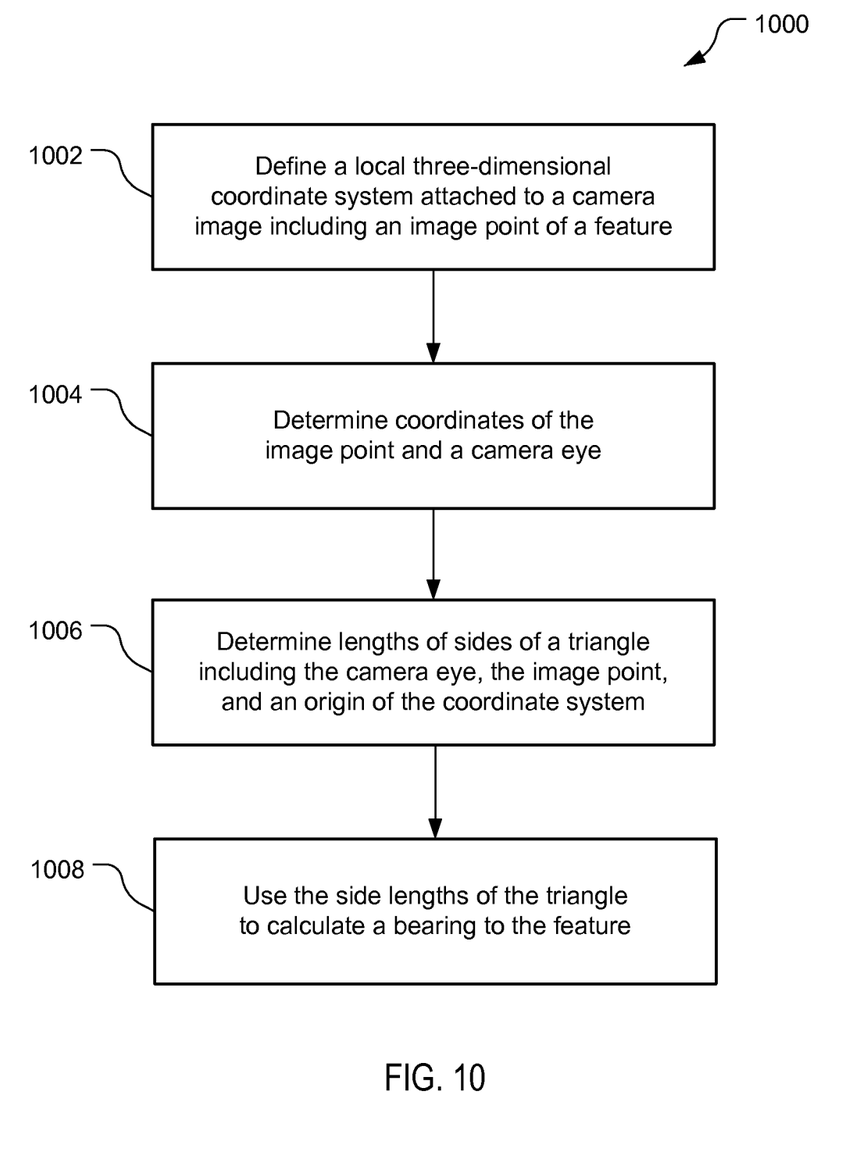
FIG. 10 is a block flow diagram of a process of calculating a bearing to a feature within an image captured by a camera of an access terminal shown in FIG. 1.

The example process 1000 for calculating a bearing to the feature references a perspective view 800 of FIG. 8. The perspective view 800 shows a point A representing an object (i.e., the identified feature) within an image captured by the camera 57. Point O represents the observer's position corresponding to the eye of the camera 57. The projective plane 80 of the camera 57 is located at a focal distance f from the camera eye O. An image 82 is created on the projective plane 80. Image A' of point A is an image point at which the ray OA pierces the projective plane 80. The angle θ (i.e., angle O'OA') is the angle at which point A is seen, with respect to the AT 16 heading, from the observer's position O, where the camera eye is located. Knowledge of the location of point A' on the camera image 82 is sufficient to determine the angle θ.

Referring to FIG. 10, with further reference to FIGS. 7-8, the process 1000 of calculating a bearing to a feature within an image captured by a camera of an AT 16 includes the stages shown. The process 1000 is, however, exemplary only and not limiting. The process 1000 can be altered, e.g., by having stages added, removed, or rearranged.

At stage 1002, a processor defines a local three-dimensional coordinate system attached to a camera image 82 including an image point A', which is a projection of point A onto the projective plane 80. In FIG. 8, a local three-dimensional Cartesian system is attached to the camera image 82. The origin of the coordinate system is point O', the projection of the camera eye O onto the projective plane 80 along a line perpendicular to the projective plane 80. This point is called the principal point of the projection and has coordinates (0, 0, 0) in the coordinate system. The x-axis is directed to the right of the camera image 82, the y-axis is directed upwards, and the z-axis is perpendicular to the projective plane 80 and points toward the camera eye O.

At stage 1004, the processor determines coordinates of the image point A' and the camera eye O in the local three-dimensional coordinate system. For digital cameras, a convenient unit of length is a pixel, and the coordinates of all points on the image 82 can be measured and expressed in pixels. For example, the processor 50 of the AT 16 can determine the location of the point A' on the image 82 and use the known resolution in pixels of the image 82 to calculate the image coordinates in pixels of the point A'. The focal distance f of the camera 57 is also measured in pixels, the value of which is determined during calibration of the camera 57.

If point A' has image coordinates of $(x_{A'}, y_{A'})$, the coordinates of A' in the local three-dimensional coordinate system is $(x_{A'}, y_{A'}, 0)$, because point A' lies in the projective plane 80, which has a z coordinate of zero. Point O, which lies on the z-axis, has coordinates (0, 0, f).

At stage 1006, the processor determines lengths of sides of a triangle O'OA' formed by the camera eye O, the image point A', and the origin of the coordinate system O'. With the coordinates of A', O', and O, the length of the sides of triangle O'OA' can be determined. For l=length (OO')=f (i.e., the focal distance), m=length (O'A'), and n=length (OA'), the equations for the lengths are:

$$l = f \quad (5)$$

$$m = \sqrt{(x_{A'} - x_{O'})^2 + (y_{A'} - y_{O'})^2 + (z_{A'} - z_{O'})^2} \text{ simplified to } m = \sqrt{(x_{A'})^2 + (y_{A'})^2} \quad (6)$$

$$n = \sqrt{(x_{A'} - x_{O})^2 + (y_{A'} - y_{O})^2 + (z_{A'} - z_{O})^2} \text{ simplified to } n = \sqrt{(x_{A'})^2 + (y_{A'})^2 + (f)^2} \quad (7)$$

after substitution of the point coordinates.

At stage 1008, the processor uses the side lengths of triangle O'OA' to determine the angle θ, i.e., the bearing to the identified feature with respect to the AT 16 heading. From trigonometry, the angle θ can be expressed as:

$$\theta = \tan\left(\frac{m}{l}\right) = \tan\left(\frac{\sqrt{(x_{A'})^2 + (y_{A'})^2}}{f}\right). \quad (8)$$

Returning to stage 906 of FIG. 9, the compass bearing to the feature within the image is calculated using equation (3) as the sum of the AT 16 heading (i.e., γ), with respect to Compass North, and the bearing to the identified feature (i.e., θ), with respect to the AT 16 heading. The heading of the AT 16 with respect to Compass North can be determined, for example, by the magnetometer 58 of the AT 16, while the bearing θ can be calculated using equation (8).

If the processor performing the process 900 is part of the AT 16, the bearing calculation module 68 of the AT 16 can calculate the compass bearing to the feature at stage 906. In other implementations, the processor performing the process 900 is part of some other entity of the wireless communication system 100, for example, the BTS 14. This entity can calculate the compass bearing after wirelessly receiving from the AT 16 the heading γ and either the bearing θ or information for calculating the bearing θ (e.g., the captured image, the pixel resolution of the camera 57, and the focal distance f of the camera 57).

At stage 908, the processor calculates a true bearing to the feature within the image using the geographical location of the corresponding keypoint and the position of the AT 16. Calculation of the true bearing can include calculation of the difference in the geographical location of the corresponding keypoint and the position of the AT 16 in units of length. Calculation of this difference is described below.

The AT 16 of FIG. 1 can receive multiple keypoints (e.g., as physical descriptions of multiple keypoints) and a geographical location of each respective keypoint. Preferably, each geographical location is a location near the position of the AT 16. The position of the AT 16 can be determined, for example, using GPS, A-GPS, or a cell-based positioning method.

The wireless communication system 100 of FIG. 1 stores the keypoints and geographical locations for a coverage area in a relational database or other information repository. The keypoints and their geographical locations can be accumulated in, stored in, indexed in, and retrieved from the database or repository. Multiple keypoints and their respective geographical locations can be retrieved and transmitted to the AT 16 or some other entity of the wireless communication system 100. For example, the AT 16 can receive the multiple keypoints and geographical locations in response to a request by the AT 16, where the request can include the position of the AT 16. A server or another component of the BTS 14, or a different entity (not shown) of the wireless communication system 100, can respond to the request from the AT 16 by retrieving and transmitted the requested keypoints and geographical locations. In some implementations, without receiving requests for keypoints, the BTS 14 transmits to ATs 16 in its coverage area, on a regular or an irregular schedule, keypoints and their geographical locations, where keypoints sent to a particular AT 16 have geographical locations near the position of that AT 16.

The difference, in units of length, in the geographical location of the corresponding keypoint and the position of the AT 16 can be calculated as follows. The observer's geographical position O (i.e., the position of the AT 16) is accessible, from stage 902. The observer's geographical position O, in latitudinal and longitudinal coordinates, is given by ($lat_O$, $long_O$). The geographical location of a keypoint determined as corresponding to an identified feature can be used as the geographical location of the corresponding identified feature. Thus, the geographical location of the identified feature A, in latitudinal and longitudinal coordinates, is given by ($lat_A$, $long_A$), the coordinates of the corresponding keypoint.

The true bearing (i.e., the azimuth) to the feature A is the angle between True North and the direction of the feature A, measured clockwise from North. In order to calculate the true bearing from the observer's geographical position O to the feature A, the algebraic differences between longitude and latitude in minutes of arc are calculated as follows:

$$\Delta lat = lat_A - lat_O \quad (9)$$

$$\Delta long = long_A - long_O \quad (10)$$

The differences of latitude and longitude can be converted into a desired unit of length. For example, differences in degrees of latitude and longitude can be converted into Nautical Miles. A Nautical Mile, which is equal to 1852 meters by international agreement, is defined as one minute of arc of a meridian. That is, the difference of latitude can be directly expressed in Nautical Miles. Therefore, the difference of latitude $\Delta lat$ in equation (9) can be expressed in minutes of arc of the meridian, i.e., Nautical Miles. The difference of longitude $\Delta long$ in equation (10) can be expressed in minutes of arc of the parallel of latitude. The parallels of latitude are not great circles of the Earth's sphere, and thus, they do not have a constant length and their radii are proportional to cosine of latitude. To express the difference of longitude in Nautical Miles, the difference of longitude is multiplied by cosine of latitude. Thus, the equation to convert the difference of longitude $\Delta long$ in minutes of arc to Nautical Miles is:

$$\Delta v = \Delta long \times \cos(lat_O). \quad (11)$$

Referring to FIG. 7, a right triangle is created by a line from O to A, a line from O in the direction of True North (i.e., TN), and the line 710 including A. The side of the right triangle formed by the segment of line 710 from feature A to the intersection with the line in the direction of True North has length $\Delta v$, the difference in longitude between O and A in Nautical Miles. The side of the right triangle formed by the segment of the line in the direction of True North from O to the intersection with line 710 has length $\Delta lat$, the difference in latitude between O and A in Nautical Miles. Using the calculated lengths of these sides of the right triangle, the angle of true bearing can be calculated from basic trigonometry as follows:

$$TB = \arctan\left(\frac{\Delta v}{\Delta lat}\right) = \arctan\left(\frac{\Delta long \times \cos(lat_o)}{\Delta lat}\right). \quad (12)$$

Calculation of true bearing using equation (12) involves careful application of sign rules to the differences $\Delta v$ and $\Delta lat$ to ensure that the true bearing is properly expressed in the 0°-360° range.

Returning to FIG. 9, the processor can calculate the true bearing to the identified feature of stage 908 using equations (9)-(12). If the processor is part of the AT 16, the bearing calculation module 68 of the AT 16 can calculate the true bearing. In other implementations, the processor is part of some other entity of the wireless communication system 100, for example, the BTS 14. This entity can calculate the true bearing with access to the position of the AT 16 and the geographical location of the keypoint determined as corresponding to the identified feature.

At stage 910, the processor determines the magnetic deviation corresponding to the position of the AT 16 by subtracting from the true bearing the compass bearing and a magnetic declination corresponding to the position of the AT 16. To calculate the magnetic deviation, the processor needs to obtain the magnetic declination corresponding to the position of the AT 16. A value and sign for the magnetic declination can be obtained by the processor, for example, by retrieval from a repository or access to a declination chart (e.g., chart 300 of FIG. 3). For example, the AT 16 can wirelessly receive the magnetic declination in response to a request including the position of the AT 16. An entity of the wireless communication system 100 (e.g., the BTS 14) can receive the request, access the repository, and respond to the AT 16 with the magnetic declination.

With the true bearing (i.e., TB), compass bearing (i.e., CB), and magnetic declination (i.e., d) accessible or calculated, the processor can calculate the magnetic deviation using equation (13) as follows:

$$\delta = TB - CB - d, \quad (13)$$

where equation (13) is equation (2) rewritten to solve for the magnetic deviation $\delta$. Calculation of the magnetic deviation using equation (13) involves careful application of sign rules to ensure the correct algebraic sign of $\delta$. That is, $\delta$ is positive or East if Compass North is to the right of Magnetic North (i.e., as illustrated in FIGS. 4 and 7), and negative or West if Compass North is to the left of Magnetic North.

If the processor performing the process 900 is part of the AT 16, the deviation calculation module 69 of the AT 16 can determine the magnetic deviation at stage 910. In other implementations, the processor is part of some other entity of the wireless communication system 100, for example, the BTS 14. This entity can calculate the magnetic deviation using equation (13) with access to the magnetic declination d and knowledge of the compass bearing and true bearing calculated at stages 906 and 908, respectively.

Once the magnetic declination and magnetic deviation are known, magnetic measurements from a magnetometer (e.g., the magnetometer 58 of the AT 16) can be corrected. For example, the compass bearing calculated at stage 906 can be corrected relative to True North by adding the magnetic deviation and the magnetic declination to the compass bearing.

In some implementations, the AT 16 automatically (e.g., periodically) takes and reports data points for determining magnetic deviation. For example, the AT 16 can capture additional images with the camera 57, determine automatically updated headings of the AT 16 using the magnetometer 58, and transmit (e.g., wirelessly) the additional images, updated positions, and the updated headings to another entity of the wireless communication system 100 to determine magnetic deviations corresponding to the updated positions of the AT 16. In other implementations, the AT 16 automatically (e.g., periodically) uses the updated information to determine the magnetic deviations corresponding to the updated positions and automatically transmits the determined magnetic deviations to another entity of the wireless communication system 100.

In some implementations, the processor is configured to wirelessly transmit (e.g., via a transceiver) the magnetic deviation after calculation at stage 910. This is discussed in further detail below with respect to FIG. 11.

In some implementations, an entity of the wireless communication system 100 that is not the AT 16 determines magnetic deviation corresponding to the position of the AT 16. This entity can receive, e.g., wirelessly, information about the correspondence between a keypoint and a feature within the image captured by the AT 16 from another entity (e.g., the AT 16) of the wireless communication system 100.

The user of the AT 16 can choose to opt-in to magnetic deviation determination, for example, by activating this functionality using menu options in a graphical user interface of the AT 16 display. If the user chooses not to opt-in to magnetic deviation determination, other methods of navigation can be performed for the AT 16.

In some implementations, the AT 16 is used to determine magnetic deviation of a place and the information about magnetic deviation is stored in a repository only if the position of the AT 16 is very accurately known and features with known geographical positions can be identified in the camera image. However, once the information about magnetic deviation of the place is stored in the repository, the information can be made available to users who later visit the place and know their position only approximately. Knowledge of the magnetic deviation enables compass applications on a user's AT 16 to function properly. The knowledge also enables more accurate position determination from compass bearings.

Process of Providing Magnetic Deviation

Figure 11:
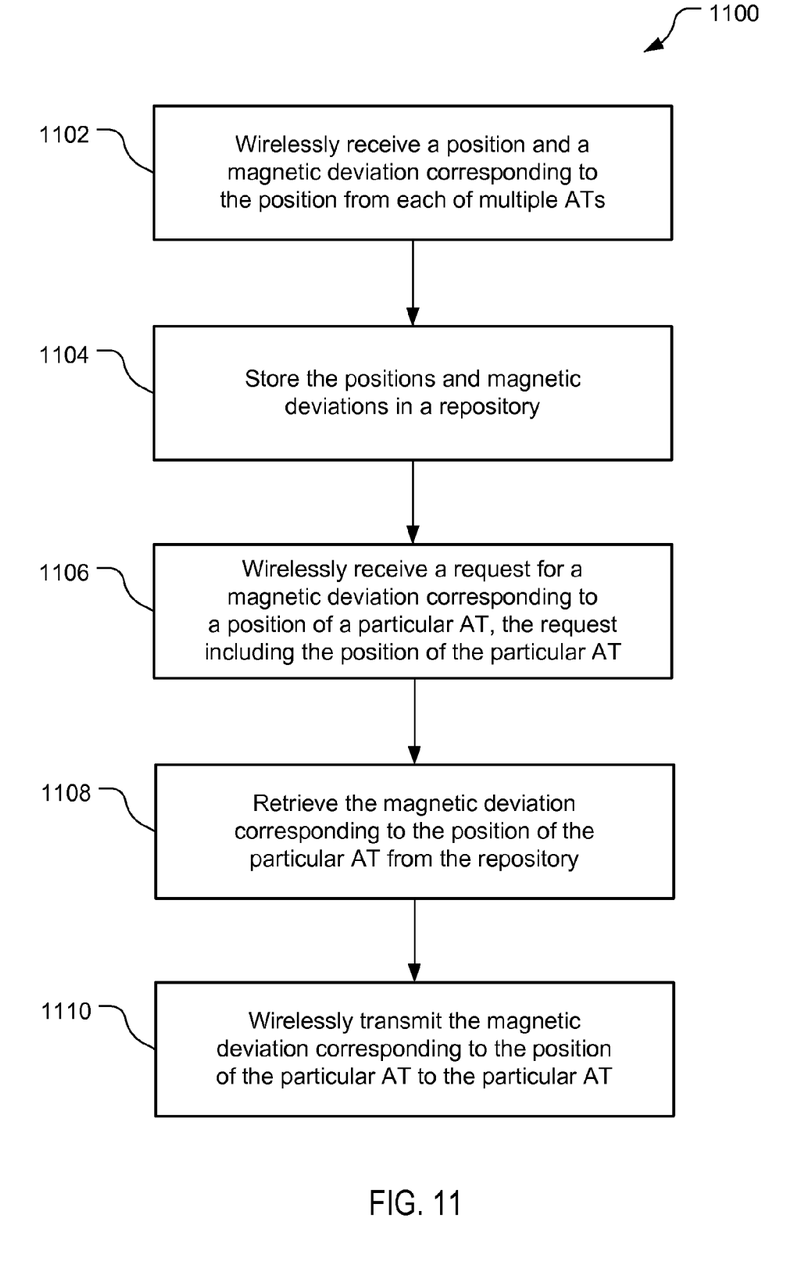
FIG. 11 is a block flow diagram of a process of gathering and providing magnetic deviation corresponding to positions in the wireless communication system shown in FIG. 1.

Referring to FIG. 11, with further reference to FIG. 5 a process 1100 of gathering and providing magnetic deviation corresponding to positions in a wireless communication system 100 includes the stages shown. The process 1100 is, however, exemplary only and not limiting. The process 1100 can be altered, e.g., by having stages added, removed, or rearranged.

At stage 1102, a processor wirelessly receives a position and a magnetic deviation corresponding to the position from each of multiple ATs 16. For example, a processor of the BTS 14 of FIG. 1, or some other entity of the wireless communication system 100, can wirelessly receive the position and the magnetic deviation from an AT 16, along with date and time information from the AT 16. The magnetic deviation can be determined using process 900 of FIG. 9 by ATs 16 enabled with computer vision techniques.

At stage 1104, the processor stores the positions and the magnetic deviations in a relational database or other information repository. The positions and the magnetic deviations can be accumulated in, stored in, indexed in, and retrieved from the database or repository. In some implementations, if date and time information is received from the AT 16 with the position and magnetic deviation, the date and time information can be used to determine whether the corresponding received magnetic deviation is current or outdated. In some implementations, the processor prompts the multiple ATs 16 to determine and report the positions and the magnetic deviations. For example, the processor can transmit, e.g., wirelessly via a transceiver, a request to each of the multiple ATs 16 to determine and transmit the positions and the magnetic deviations.

At stage 1106, the processor wirelessly receives a request for a magnetic deviation corresponding to a position of a particular AT 16, where the request includes the position of the particular AT 16. The particular AT 16 can be a less-advanced access terminal that is not enabled with computer vision techniques.

At stage 1108, the processor retrieves the magnetic deviation corresponding to the position of the particular AT 16 from the repository. For example, the magnetic deviations can be indexed in the repository by the corresponding positions. A magnetic deviation can be retrieved, for example, by querying the repository with the respective position.

At stage 1110, the processor wirelessly transmits the magnetic deviation corresponding to the position of the particular AT 16 to the particular AT 16. For example, a server or another component of the BTS 14, or a different entity (not shown) of the wireless communication system 100, can respond to the request from the AT 16 by retrieving and transmitting the requested magnetic deviation. Compass applications on the AT 16 can properly function by using the received magnetic deviation. In some implementations, the processor wirelessly transmits the magnetic deviation to other ATs 16 with approximately the same position as the position of the particular AT 16. In some implementations, without receiving requests for magnetic deviations, the BTS 14 transmits to ATs 16 in its coverage area, on a regular or an irregular schedule, the magnetic deviations, where the respective magnetic deviation sent to a particular AT 16 corresponds to the position of that AT 16.

In some implementations, the magnetic deviations wirelessly received from the multiple ATs 16 at stage 1102 are interpolated. For example, while the positions and the magnetic deviations are being accumulated in the repository over time, the magnetic deviations can be interpolated to provide estimates of the magnetic deviations corresponding to positions that have not yet been provided by one of the multiple ATs 16. The processor can determine, e.g., at stage 1108, that a magnetic deviation corresponding to the position of the particular AT 16 is not available in the repository, and can calculate the magnetic deviation for the particular AT 16 by retrieving from the repository and interpolating magnetic deviations corresponding to positions near the position of the particular AT 16.

If multiple ATs 16 transmit the magnetic deviation corresponding to the same position, the received magnetic deviation values can be averaged or formal statistical processing can be applied to obtain robust estimates of the magnetic deviation. Additionally, the processor can stop storing newly received magnetic deviations for a particular position once a threshold number of magnetic deviations for that position have already been received. Furthermore, newly received magnetic deviations for a particular position can serve as a check and can provide hints about changes in the magnetic deviation over time.

In some implementations, the processor generates a chart of magnetic deviation corresponding to positions in the wireless communication system 100. The chart can be similar to the chart 300 of FIG. 3 for magnetic declination, except that the deviation chart would cover a smaller geographical region (e.g., a neighborhood of a city) and have a higher resolution to detail the variation in magnetic deviation over short distances (e.g., on the order of meters in some urban environments). The deviation chart could further include the magnitude of the magnetic force vector at the given place and its tilt with respect to the horizon plane.

Process of Correcting a Magnetometer Measurement Using Magnetic Deviation

Figure 12:
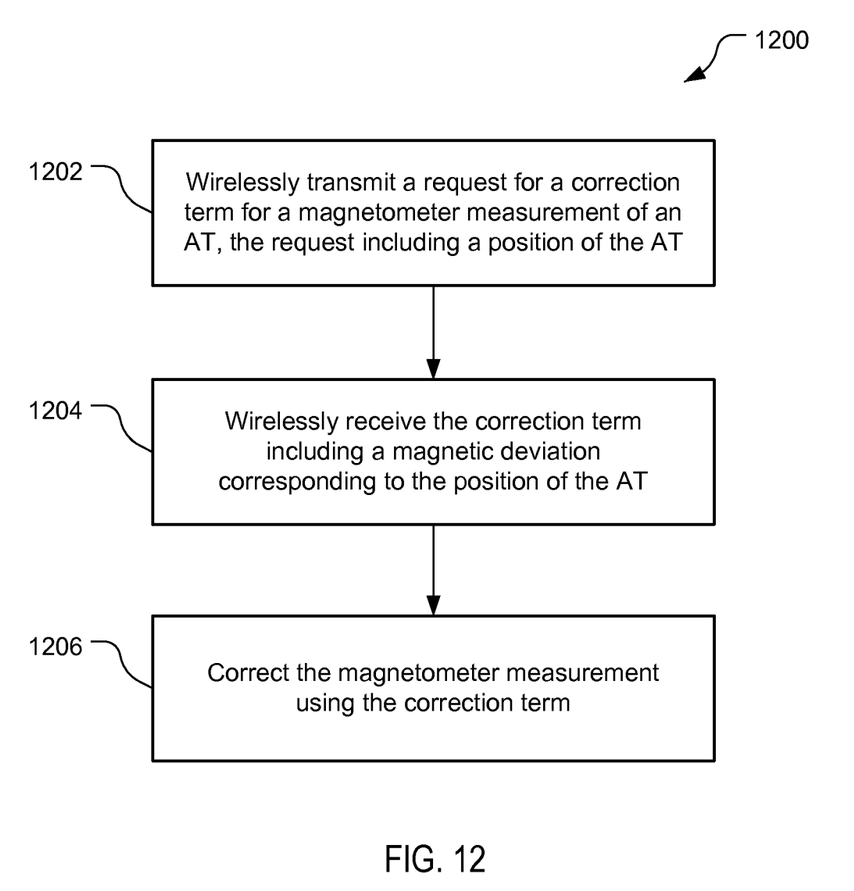
FIG. 12 is a block flow diagram of a process of correcting a magnetometer measurement using a correction term including a magnetic deviation.

Referring to FIG. 12, with further reference to FIG. 5 a process 1200 of correcting a magnetometer measurement using a correction term including a magnetic deviation includes the stages shown. The process 1200 is, however, exemplary only and not limiting. The process 1200 can be altered, e.g., by having stages added, removed, or rearranged.

At stage 1202, a processor wirelessly transmits a request for a correction term for a magnetometer measurement of an AT 16, where the request includes a position of the AT 16. For example, the processor 50 of AT 16 can wirelessly transmit the request via the transceiver 54. The AT 16 does not need to be enabled with computer vision techniques.

At stage 1204, the processor wirelessly receives the correction term including a magnetic deviation corresponding to the position of the AT 16. For example, the processor 50 of AT 16 can wirelessly receive the correction term via the transceiver 54 in response to the request.

At stage 1206, the processor corrects the magnetometer measurement using the correction term. In some implementations, the correction term includes a magnetic declination corresponding to the position of the AT 16. For example, the measurement of the magnetometer 58 can be a compass bearing, which can be corrected for True North by adding a correction term including both a magnetic declination and a magnetic deviation.

Considerations Regarding the Description

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of computer-readable media.

The previous description is provided to enable any person skilled in the art to make and/or use the apparatus, systems, and methods described. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of providing magnetic deviation corresponding to positions in a wireless communication system, the method comprising:
receiving positions and magnetic deviations corresponding to the positions from each of a plurality of mobile access terminals in the wireless communication system;
storing the positions and the magnetic deviations corresponding to the positions in a repository;
receiving a request wirelessly for a magnetic deviation corresponding to a position of an access terminal, the request including the position of the access terminal;
retrieving the magnetic deviation corresponding to the position of the access terminal from the repository; and transmitting wirelessly the magnetic deviation corresponding to the position of the access terminal to the access terminal.

2. The method of claim 1, further comprising transmitting wirelessly the magnetic deviation corresponding to the position of the access terminal to other access terminals with approximately the same position.

3. The method of claim 1, wherein retrieving the magnetic deviation comprises:
determining that a magnetic deviation corresponding to the position of the access terminal is not available in the repository; and
calculating the magnetic deviation corresponding to the position of the access terminal by retrieving from the repository magnetic deviations corresponding to positions near the position of the access terminal and interpolating these magnetic deviations.

4. The method of claim 1, wherein receiving positions and magnetic deviations comprises receiving the magnetic deviations corresponding to the positions from each of the plurality of access terminals.

5. The method of claim 1, wherein for each position and corresponding magnetic deviation, receiving the position and magnetic deviation comprises:
receiving an image captured by the an access terminal, the position of the access terminal, and a plurality of keypoints and a geographical location of each respective keypoint, each geographical location being a location near the position of the access terminal;
identifying a feature within the image;
searching the plurality of keypoints for the feature that is identified; and
determining the magnetic deviation corresponding to the position of the access terminal by calculating a compass bearing and a true bearing to the feature within the image using the position of the access terminal and the geographical location of a keypoint, from the plurality of keypoints, determined as corresponding to the feature.

6. An access terminal of a wireless communication system, the access terminal comprising:
a camera configured to capture an image;
a magnetometer configured to make a magnetic measurement;
a transceiver communicatively coupled to the camera and the magnetometer and configured to transmit and receive information wirelessly; and
a processor communicatively coupled to the camera, the transceiver and the magnetometer and configured to:
transmit, wirelessly via the transceiver, a request for plurality of keypoints and a geographical location of each respective keypoint, each geographical location being a location near a position of the access terminal;
receive, wirelessly via the transceiver, the plurality of keypoints and geographical locations;
identify a feature within an image captured by the access terminal at the position;
search the plurality of keypoints for the feature that is identified; and
determine a magnetic deviation corresponding to the position of the access terminal by calculating a compass bearing and a true bearing to the feature within the image using the position of the access terminal and the geographical location of a keypoint, from the plurality of keypoints, determined as corresponding to the feature; and
transmit wirelessly the position of the access terminal and the corresponding magnetic deviation.

7. A non-transitory computer program product comprising:
a processor-readable medium storing processor-readable instructions configured to cause a processor to:
storing in a repository positions and magnetic deviations corresponding to the positions received from each of a plurality of mobile access terminals of a wireless communication system;
retrieve from the repository a magnetic deviation corresponding to a position of an access terminal of the wireless communication system, the retrieval in response to a request wirelessly received for the magnetic deviation, the request including the position of the access terminal; and
provide the magnetic deviation corresponding to the position of the access terminal for transmitting wirelessly to the access terminal.

8. The non-transitory computer program product of claim 6, further comprising instructions configured to cause the processor to provide the magnetic deviation corresponding to the position of the access terminal for transmitting wirelessly to other access terminals with approximately the same position.

9. The non-transitory computer program product of claim 6, wherein the instructions configured to cause the processor to retrieve the magnetic deviation comprise instructions configured to cause the processor to:
determine that a magnetic deviation corresponding to the position of the access terminal is not available in the repository; and
calculate the magnetic deviation corresponding to the position of the access terminal by retrieving from the repository magnetic deviations corresponding to positions near the position of the access terminal and interpolating these magnetic deviations.

10. A non-transitory computer program product comprising:
a processor-readable medium storing processor-readable instructions configured to cause a processor to:
request a plurality of keypoints and a geographical location of each respective keypoint, each geographical location being a location near a position of an access terminal of a wireless communication system;
access the plurality of keypoints and geographical locations which is wirelessly received in response to the request;
identify a feature within an image captured by the access terminal at the position;
search the plurality of keypoints for the feature that is identified; and
determine a magnetic deviation corresponding to the position of the access terminal by calculating a compass bearing and a true bearing to the feature within the image using the position of the access terminal and the geographical location of a keypoint, from the plurality of keypoints, determined as corresponding to the feature.

11. The non-transitory computer program product of claim 9, wherein the instructions are further configured to cause the processor to transmit wirelessly the position of the access terminal and the corresponding magnetic deviation.

12. An apparatus configured to provide magnetic deviation corresponding to positions in a wireless communication system, the apparatus comprising:
means for receiving positions and magnetic deviations corresponding to the positions from each of a plurality of mobile access terminals in the wireless communication system;

means for storing the positions and the magnetic deviations corresponding to the positions in a repository;

means for receiving a request wirelessly for a magnetic deviation corresponding to a position of an access terminal, the request including the position of the access terminal;

means for retrieving the magnetic deviation corresponding to the position of the access terminal from the repository; and means for transmitting wirelessly the magnetic deviation corresponding to the position of the access terminal to the access terminal.

13. The apparatus of claim 12, further comprising means for transmitting wirelessly the magnetic deviation corresponding to the position of the access terminal to other access terminals with approximately the same position.

14. The apparatus of claim 12, wherein the means for retrieving the magnetic deviation comprise:

means for determining that a magnetic deviation corresponding to the position of the access terminal is not available in the repository; and means for calculating the magnetic deviation corresponding to the position of the access terminal by retrieving from the repository magnetic deviations corresponding to positions near the position of the access terminal and interpolating these magnetic deviations.

15. An apparatus comprising:

means for requesting a plurality of keypoints and a geographical location of each respective keypoint, each geographical location being a location near a position of an access terminal of a wireless communication system;

means for wirelessly receiving the plurality of keypoints and geographical locations;

means for identifying a feature within an image captured by the access terminal at the position;

means for searching the plurality of keypoints for the feature that is identified; and means for determining a magnetic deviation corresponding to the position of the access terminal by calculating a compass bearing and a true bearing to the feature within the image using the position of the access terminal and the geographical location of a keypoint, from the plurality of keypoints, determined as corresponding to the feature.

16. The apparatus of claim 15, further comprising means for transmitting the position of the access terminal and the corresponding magnetic deviation.

17. An apparatus of a wireless communication system, the apparatus comprising:

a transceiver configured to receive and transmit information wirelessly; and a processor communicatively coupled to the transceiver and configured to:

receive positions and magnetic deviations corresponding to the positions from each of a plurality of mobile access terminals in the wireless communication system;

store the positions and the magnetic deviations corresponding to the positions in a repository;

receive with the transceiver a request wirelessly for a magnetic deviation corresponding to a position of an access terminal, the request including the position of the access terminal;

retrieve the magnetic deviation corresponding to the position of the access terminal from the repository; and transmit with the transceiver the magnetic deviation corresponding to the position of the access terminal to the access terminal.

18. A method comprising:

requesting a plurality of keypoints and a geographical location of each respective keypoint, each geographical location being a location near a position of an access terminal of a wireless communication system;

wirelessly receiving the plurality of keypoints and geographical locations;

identifying a feature within an image captured by the access terminal at the position;

searching the plurality of keypoints for the feature that is identified; and determining a magnetic deviation corresponding to the position of the access terminal by calculating a compass bearing and a true bearing to the feature within the image using the position of the access terminal and the geographical location of a keypoint, from the plurality of keypoints, determined as corresponding to the feature.

* * * * *